US008458326B2

(12) United States Patent
Cormode et al.

(10) Patent No.: US 8,458,326 B2
(45) Date of Patent: Jun. 4, 2013

(54) SAMPLING FROM DISTRIBUTED STREAMS OF DATA

(75) Inventors: Graham Cormode, Morristown, NJ (US); Ke Yi, Clear Water Bay (CN); Qin Zhang, Kowloon (CN)

(73) Assignee: AT&T Intellecutal Property I, L.P., Atlanta, GA (US)

( * ) Notice: Subject to any disclaimer, the term of this patent is extended or adjusted under 35 U.S.C. 154(b) by 376 days.

(21) Appl. No.: 12/826,785

(22) Filed: Jun. 30, 2010

(65) Prior Publication Data

US 2012/0005329 A1  Jan. 5, 2012

(51) Int. Cl.
G06F 15/173  (2006.01)
(52) U.S. Cl.
USPC .......................... 709/224; 709/223; 709/235
(58) Field of Classification Search
USPC .......................... 709/224, 223, 235
See application file for complete search history.

(56) References Cited

U.S. PATENT DOCUMENTS

| 2003/0135525 | A1* | 7/2003 | Huntington et al. | 707/501.1 |
| 2005/0210533 | A1* | 9/2005 | Copeland et al. | 726/23 |
| 2007/0011319 | A1* | 1/2007 | McClure et al. | 709/224 |
| 2007/0019548 | A1* | 1/2007 | Krishnamurthy | 370/232 |
| 2008/0219181 | A1* | 9/2008 | Kodialam et al. | 370/252 |

OTHER PUBLICATIONS

Cormode, G. "Optimal Sampling from Distributed Streams" PODS'10, Jun. 6-11, 2010, Indianapolis, IN, pp. 1-10, [online] [retrieved on Nov. 1, 2010] retrieved from: http://www.cs.ust.hk/~yike/pods10-cdsample.pdf.

* cited by examiner

Primary Examiner — Nicholas Taylor
(74) Attorney, Agent, or Firm — Hartman & Citrin LLC

(57) ABSTRACT

The present disclosure is directed to systems, methods, and computer-readable storage media for sampling from distributed data streams. Data elements are received at site servers configured to collect and report data to a coordinator device. The site servers assign a binary string to each of the data elements. Each bit of the binary strings can be independently set to a 0 or a 1 with a probability of one half. The binary string is used to sample from the received data elements, and the data elements and/or the sampled data elements can be transmitted to a coordinator device. The coordinator device can examine one or more bits of the binary string to draw samples of the received data elements in accordance with desired probabilities.

20 Claims, 7 Drawing Sheets

SAMPLING FROM DISTRIBUTED STREAMS OF DATA

BACKGROUND

This application relates generally to sampling of data. More specifically, the disclosure provided herein relates to sampling from distributed steams of data.

In the communication age, some data management systems must collect and analyze large quantities of data. These data may be observed at data collection devices distributed at geographically diverse locations, and may be communicated to the data management systems from the data collection devices. The data collection devices may track and report increasingly detailed data due to enhanced measurement devices, increasing numbers of sensors and sensor networks, and/or increased measurement granularity. Thus, tracking and reporting of data may require storage and transmission of large volumes of data. In light of these improvements, issues with regard to collecting all observed data at a single data management system and/or performing analysis with respect to all of the observed data may present a challenge.

Additionally, some data management systems rely upon various queries and other operations that may be generated and/or iterated numerous times. These queries and other operations may request information or trigger various activities based upon all data that has been collected across the data collection devices at any particular time. Performing such queries or other operations presents additional challenges with respect to data management systems. These challenges have led to the formalization of the continuous, distributed, streaming model of data management systems. In the continuous, distributed, streaming model of data management systems, a number of distributed sites observe a stream of data and collaborate with a centralized coordinator device to answer queries over the union of the observed data.

Protocols have been defined in the continuous, distributed, streaming model of data management systems for a number of classes of queries. These protocols seek to minimize the communication, storage space, and/or time needed by each participant in the model. The protocols, however, fail to address producing a sample drawn from the distributed streams. A sample is a powerful tool, since it can be used to approximately answer many queries. Various statistics over a sample can indicate the current distribution of data in a system, and therefore can prove to be a valuable tool in the data management setting.

SUMMARY

The present disclosure is directed to sampling from distributed streams of data. Data elements are received at a number of data collection devices. The data collection devices generate one or more tags for each received data element. According to various embodiments, the tag includes a binary string and/or a time stamp. The binary string includes a number of bits, each of which independently can be set to a value of 0 or 1 with a probability of 0.5, i.e. one half. A sampling probability can be broadcast to each of the data collection devices by a data management system. The data collection devices can sample from the received data elements in accordance with the broadcast sampling probability. Sampled data elements can be transmitted to the data management system.

According to some embodiments, the data collection devices are site servers that execute a reporting application for tagging, sampling, and transmitting the data elements. In some embodiments, the data management system includes a coordination device that receives the transmitted data elements, and performs additional sampling, storage, and manipulation of the data elements to provide the functionality herein for sampling from distributed streams of data. As will be described herein, the coordination device can sample the data elements with or without replacement, across an infinite sample, and/or across windows of samples restricted on the basis of receipt sequence and/or time of receipt.

According to an aspect, a computer-implemented method for sampling distributed streams of data includes a computer-implemented operation for receiving a data element at a coordinator device. The data element includes a binary string generated by one of a plurality of site servers in communication with the coordinator device. The method further includes computer-implemented operations for examining the binary string to determine whether to assign the data element to a lower sample or to a higher sample, determining if the lower sample includes a predetermined number of data elements, and taking an action, in response to the determining. The data element can be transmitted by a site server in accordance with a probability established by the coordinator device. The data element can include a measurement associated with a communications network, the measurement being observed at the site server. The data element further can include a time stamp including data indicating a time at which the data element was received at the site server of the plurality of site servers.

In some embodiments, the binary string includes a first bit, a second bit, and a third bit, and the method includes examination of the second bit of the binary string. In response to determining that the lower sample includes the predetermined number of data elements, taking the action includes broadcasting an instruction to halve the probability with which the data elements are transmitted, discarding the higher sample, and examining the third bit of the binary string to assign each data element in the lower sample into a new lower sample and a new higher sample. In some embodiments, the binary string includes at least one bit, the at least one bit including a value of 0 or 1. In other embodiments, the binary string includes two or more bits, each of the two or more bits including a value of 0 or 1. The value of each of the two or more bits can independently be set to 0 with a probability of one half.

In some embodiments, the site server is configured to filter the data element according to the value of the first bit, and the data element is transmitted to the coordinator device only if the first bit includes a value of 0. The method also can include defining a time-based window during which the received data element is considered to be unexpired, determining if the data element was received at the site server within the time-based window, and including the data element in the sample, in response to determining that the data element was received at the site server within the time-based window.

According to another aspect, another computer-implemented method for sampling distributed streams of data includes a computer-implemented operation for receiving a data element at a coordinator device. The data element can include a binary string generated by a site server of a plurality of site servers in communication with the coordinator device. The method further can include computer-implemented operations for examining the binary string to determine whether to assign the data element to a first level or a second level, determining if a first level includes a predetermined number of data elements, and taking an action, in response to the determining.

In some embodiments, examining the binary string to determine whether to assign the data element to the first level or the second level includes determining if the data element includes the globally most recently received data element for the first level, adding the data element to a queue of data elements corresponding to the first level, in response to the determining, and prompting a site server that transmitted the data element for a next most-recent data element at the first level. In some embodiments, the method further includes in response to determining that the first level does not include the predetermined number of data elements, determining if the coordinator device has received all unexpired data elements from the site server.

According to yet another aspect, a system for sampling distributed streams of data includes a coordinator device having a processor for executing computer-executable instructions stored in a memory. Execution of the computer-executable instructions by the system cause the system to receive a data element. The data element can include a binary string generated by a site server of a plurality of site servers in communication with the coordinator device. Execution of the computer-executable instructions further can cause the system to assign the data element to a first sample or to a second sample based, at least partially, upon examining the binary string, determining if the first sample includes a predetermined number of data elements, and taking an action, in response to the determining.

In some embodiments, the binary string includes a first bit, a second bit, and a third bit. The site server assigns a value to the first bit, the second bit, and the third bit. Examining the binary string includes examining the second bit of the binary string at the coordinator device to determine whether the value of the second bit of the binary string includes a 0 or a 1. In some embodiments, in response to determining that the first sample includes the predetermined number of data elements, taking the action includes broadcasting an instruction to the plurality of site servers. The instruction can include a command to halve the probability with which the data elements are transmitted from the plurality of site servers to the coordinator device. Taking the action further can include discarding the second sample and examining the third bit of the binary string to assign each data element in the first sample to a third sample and a fourth sample.

In some embodiments, assigning the data element to the first sample or to the second sample includes examining the second bit of the binary string, assigning the data element to the first sample if a value of the second bit includes 0, and assigning the data element to the second sample if the value of the second bit includes 1. According to various embodiments, a probability with which the system assigns a value of 0 to the first bit is exactly ½; a probability with which the system assigns a value of 0 to the first bit and the second bit is exactly ¼; a probability with which the system assigns a value of 0 to the first bit, the second bit, and the third bit is exactly ⅛; and a probability with which the system assigns a value of 0 to the first bit, the second bit, the third bit, and a fourth bit is exactly 1/16.

In some embodiments, execution of the computer-executable instructions cause the system to define a time-based window during which the received data element is considered to be unexpired, determine if the data element was received at the site server within the time-based window, and include the data element in a level-sampling data structure, in response to determining that the data element was received at the site server within the time-based window. Assigning the data element to the first sample or the second sample can include determining if the data element includes the globally most recently received data element for a bit level of the binary string, adding the data element to a queue of data elements corresponding to the first sample, in response to the determining, and prompting a site server that transmitted the data element for a next most-recent data element at the bit level.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to methods, systems, and computer-readable media for sampling from distributed streams of data. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
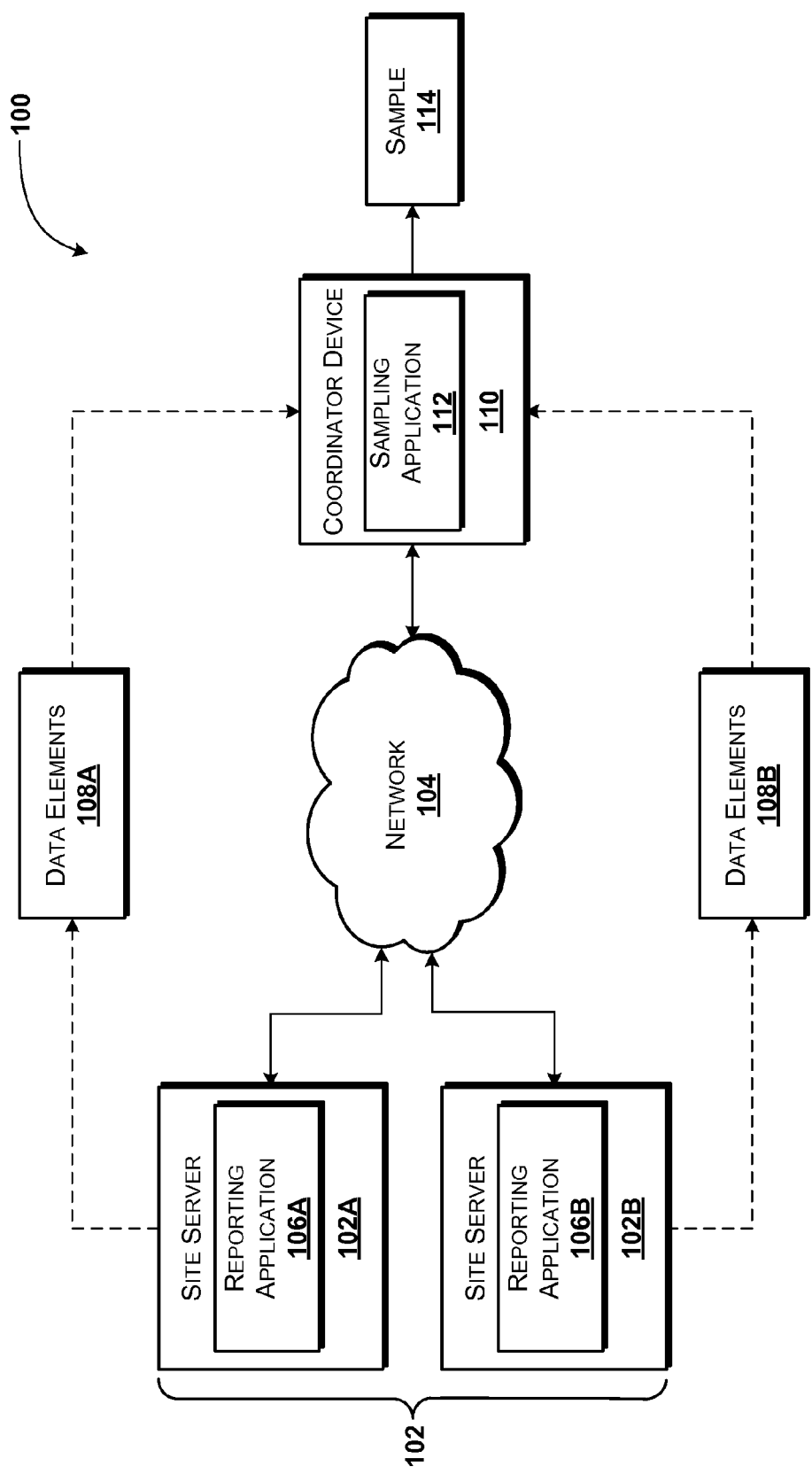
FIG. 1 is a system diagram schematically illustrating a system for sampling from distributed streams of data, according to an exemplary embodiment.

Referring now to FIG. 1, aspects of a system 100 for sampling from distributed streams of data are will be described, according to exemplary embodiments. The system 100 shown in FIG. 1 includes one or more site servers 102A-B (hereinafter collectively referred to as site servers 102). According to various embodiments, the functionality of the site servers 102 is provided by one or more desktop computers, mobile telephones, laptop computers, other computing systems, and the like. In the illustrated embodiment, the site servers 102 are server computers configured to operate on or in communication with a communications network 104. An exemplary network 104 is described in detail below with reference to FIG. 5.

Each of the site servers 102 is illustrated as including a reporting application 106A-B (hereinafter collectively referred to the reporting applications 106), though this is not necessarily the case. The reporting applications 106 are configured to receive data elements 108A-B (hereinafter collectively referred to as data elements 108) from devices, nodes, and/or networks (not illustrated) in communication with the site servers 102, to label the data elements 108 according to specified parameters, preferences, and/or settings, and to transmit the data elements 108 to a coordinator device 110 operating on or in communication with the network 104. The data elements 108 can be transmitted to the coordinator device 110 via the network 104 and/or via a direct link (not shown).

The coordinator device 110 is configured to provide the functionality described herein for sampling from distributed streams of data. The coordinator device 110 is configured to execute an operating system (not illustrated) and one or more application programs such as, for example, a sampling application 112, and/or other application programs. The operating system is a computer program for controlling the operation of the coordinator device 110. The sampling application 112 is an executable program configured to execute on top of the operating system to provide the functionality described herein.

Generally speaking, the sampling application 112 is configured to receive the data elements 108 from the site servers 102, and to determine how to draw a sample 114 from the received data elements 108. In some embodiments, the sampling application 112 draws a sample 114 from the data elements 108 based upon an infinite window of data elements 108, as will be explained in more detail with reference to FIGS. 2-3. In other embodiments, the sampling application 112 draws the sample 114 from the data elements 108 based upon a time-based window of data elements 108 as described in more detail below with reference to FIGS. 4-5. The sampling application 112 can draw the sample 114 using sampling with replacement and/or sampling without replacement, as is described in detail herein.

According to other embodiments, the sampling application 112 is configured to draw the sample 114 from the data elements 108 that exist in a sliding sequence-based window. Thus, the sample 114 generated by the sampling application 112 may be restricted to a pool of data elements 108 based upon a sequence in which the data elements 108 are received at the coordinator device 110 and/or the site servers 102. In still other embodiments, the sampling application 112 is configured to draw the sample 114 from a pool of data elements 108 that exist in a sliding time-based window. Thus, the sample 114 generated by the sampling application 112 may be restricted to a pool of data elements 108 received during a specified time window. According to various embodiments, the sampling application 112 is configured to draw the sample 114 from the sequence-based window and/or the time-based window using sampling with replacement and/or sampling without replacement. These and other features of the sampling application 112 are described in more detail below.

In some embodiments described herein, the site servers 102 apply what is referred to herein as "Binary Bernoulli Sampling." Generally speaking, Binary Bernoulli Sampling includes associating a binary string with each received data element 108. The binary string can be chosen at random, wherein each bit of the binary string is independently set to "0" or "1" with equal probability, i.e., with a probability of ½.

From a pool of data elements 108 with binary strings assigned in the above manner, one can draw a sample 114 of data elements 108, each chosen independently with a probability of $p=2^{-j}$ for any integer j, namely by sampling all data elements 108 in the pool whose binary strings match a specified pattern to the $j^{th}$ bit of the respective binary strings. For example, if a sample 114 of data elements 108 sampled at a probability of ⅛, i.e., $2^{-3}$, can be provided by sampling data elements 108 having a prefix of $0^3$, i.e., the first 3 bits of the binary strings are equal to 0. It should be understood that this example is illustrative only, and that any desired binary string can be specified, and that any particular binary string will occur with a probability of $p=2^{-j}$ for any integer j if assigned as set forth above, i.e., each bit independently set with equal probability of ½.

FIG. 1 illustrates two site servers 102, one network 104, and one coordinator device 110. It should be understood, however, that some implementations of the system 100 include three or more site servers 102, multiple networks 104, and multiple coordinator devices 110. Therefore, the illustrated embodiment should be understood as being exemplary, and should not be construed as being limiting in any way.

Figure 2:
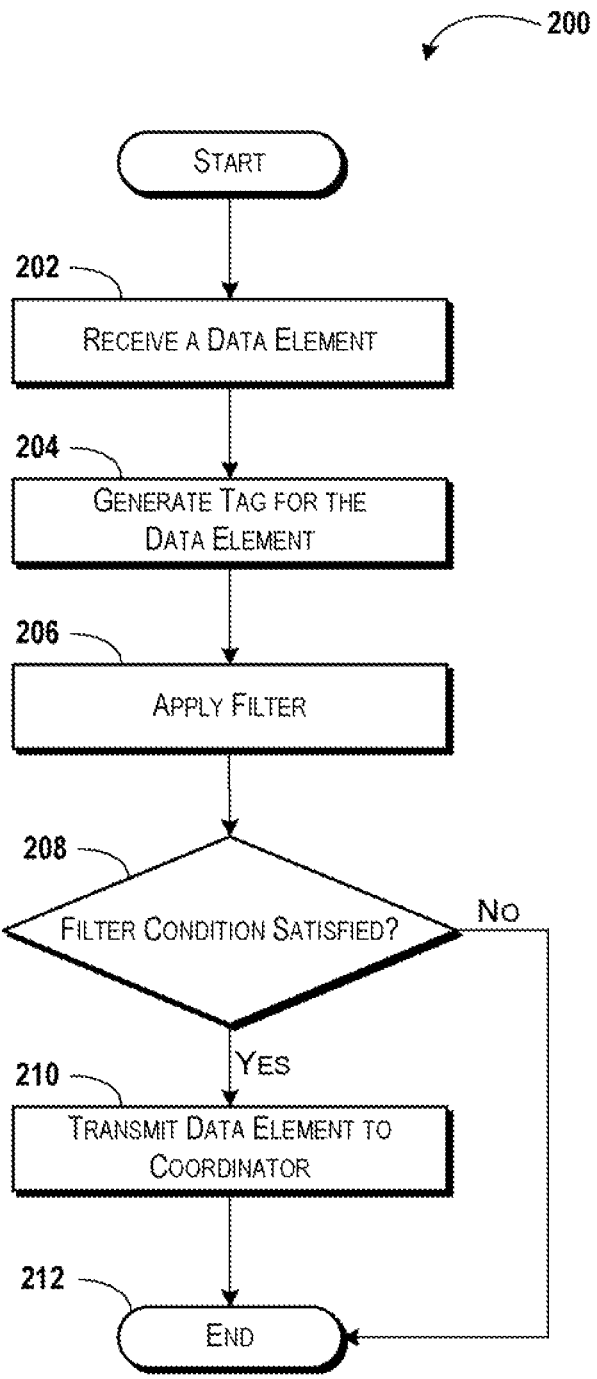
FIG. 2 is a flow diagram showing aspects of a method for collecting, tagging, and transmitting data elements from distributed streams of data, according to an exemplary embodiment.

Turning now to FIG. 2, aspects of a method 200 for collecting, tagging, and transmitting data elements from distributed streams of data will be described in detail. It should be understood that the operations of the method disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method can be ended at any time and need not be performed in its entirety. Some or all operations of the method, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 is described as being performed by one of the site servers 102. It should be understood that this embodiment is exemplary, and should not be viewed as being limiting in any way. The method 200 begins at operation 202, wherein the site server 102 receives a data element 108. The data element 108 received by the site server 102 can include data collected by a network device or node in communication with the site server 102, as well as other devices, nodes, and/or networks. In some embodiments, the site server 102 collects performance data, traffic data, and/or other data associated with the network 104. It therefore should be understood that the data element 108 can be transmitted to the site server 102 from almost any device operating on or in communication with the network 104. Some exemplary devices of the network 104 that can generate the data elements 108 will be described below with reference to FIG. 6.

According to various embodiments, the site server 102 is configured to transmit all received data elements 108 to the coordinator device 110. This embodiment is not illustrated in FIG. 2. In the illustrated embodiment, however, the site server 102 sends only a portion of the received data elements 108 to the coordinator device 110. The site server 102 determines which data elements 108 to transmit by applying the Binary Bernoulli Sampling method described herein. Other sampling methods and/or algorithms are possible, and are contemplated.

From operation 202, the method 200 proceeds to operation 204, wherein the site server 102 generates a tag for the data element 108. The tag can include a time stamp, if desired, and/or a binary string. The site server 102 creates the binary string for each data element 108. The binary string can have any number of bits, wherein the number of bits can be selected based upon various considerations including anticipated sampling rate, storage limitations, transmission capabilities, and the like. The site server 102 can be configured to randomly assign each bit of the binary string to a "0" or a "1," with a desired probability. In some embodiments, the desired probability is ½.

From operation 204, the method 200 proceeds to operation 206, wherein the site server 102 applies a filter to the data element 108. The filter applied by the site server 102 can include any specified condition including filtering of the data elements 108 based upon values of bits of the binary strings. For example, if the site server 102 is configured to send data elements 108 to the coordinator device 110 with a probability of ⅛, the filter can include a condition that the binary string be 0-0-0, 1-1-1, 0-0-1, 1-0-1, or any other desired combination of 1's and 0's, wherein any such combination will occur once in every eight data elements 108 if the value of each bit is assigned with a probability of ½ as described above. Generally speaking, the site server 102 examines a number of bits in the binary string, and forwards the associated data element 108 only if the number of bits in the binary string match a predetermined value or bit pattern such as the filter conditions set forth above. Thus, it should be understood that this filter condition is exemplary, and should not be construed as being limiting in any way.

From operation 206, the method 200 proceeds to operation 208, wherein the site server 102 determines if the condition specified by the filter applied in operation 206 is satisfied. If the filter condition is satisfied, the method 200 proceeds to operation 210, wherein the site server 102 transmits the data element 108 to the coordinator device 110. If the site server 102 determines that the filter condition is not satisfied, or after transmitting the data element 108 to the coordinator device 110 at operation 210, the method 200 proceeds to operation 212, whereat the method 200 ends.

Although not illustrated in FIG. 2, it should be understood that the site server 102 can repeat the method 200 each time a data element 108 is received at the site server 102. Thus, for example, when the next data element 108 is received at the site server 102, the site server 102 can execute the operations of the method 200 to determine whether or not to transmit the data element 108 to the coordinator device 110.

Additionally, it should be understood that each data element 108 received at the coordinator device 110 via the operations described above with reference to FIG. 2 will have identical binary strings. Therefore, in some embodiments the binary strings are conceptual only, and are not actually assigned to the data elements 108. In other embodiments, the binary strings are generated and attached to the data elements 108, but the binary strings are stripped from the data elements 108 before the data elements 108 are transmitted to the coordinator device 110 in accordance with a desired sampling rate. In other embodiments, the binary strings are generated for each data element 108, attached to the respective data elements 108, and transmitted with the data elements 108 to the coordinator device 110.

In some embodiments, the site servers 102 perform some or all operations of the method 200 by applying an algorithm to the data elements 108. For purposes of illustrating the concepts and technologies disclosed herein, the notation e is used to denote data elements 108 received by the site servers 102. Furthermore, the binary strings generated by the site servers 102 are denoted with the notation b(e). The value of each bit of the binary string b(e) is independently assigned by the site server 102 with a probability of ½. The notation f is used to denote an assignable variable, as will be understood below.

The applied algorithm includes the following steps. For each e received at the site server 102, the site server 102 assumes a value "1" for f. The site server 102 examines each bit of the binary string b(e), up to and including the $j^{th}$ bit of the binary string b(e) to determine if the bit has a value of "0" or "1." If the value of any bit in the binary string b(e) up to and including the $j^{th}$ bit is not "0," f is set equal to 0. The site servers 102 transmit each e for which f=1 to the coordinator device 110.

Figure 3:
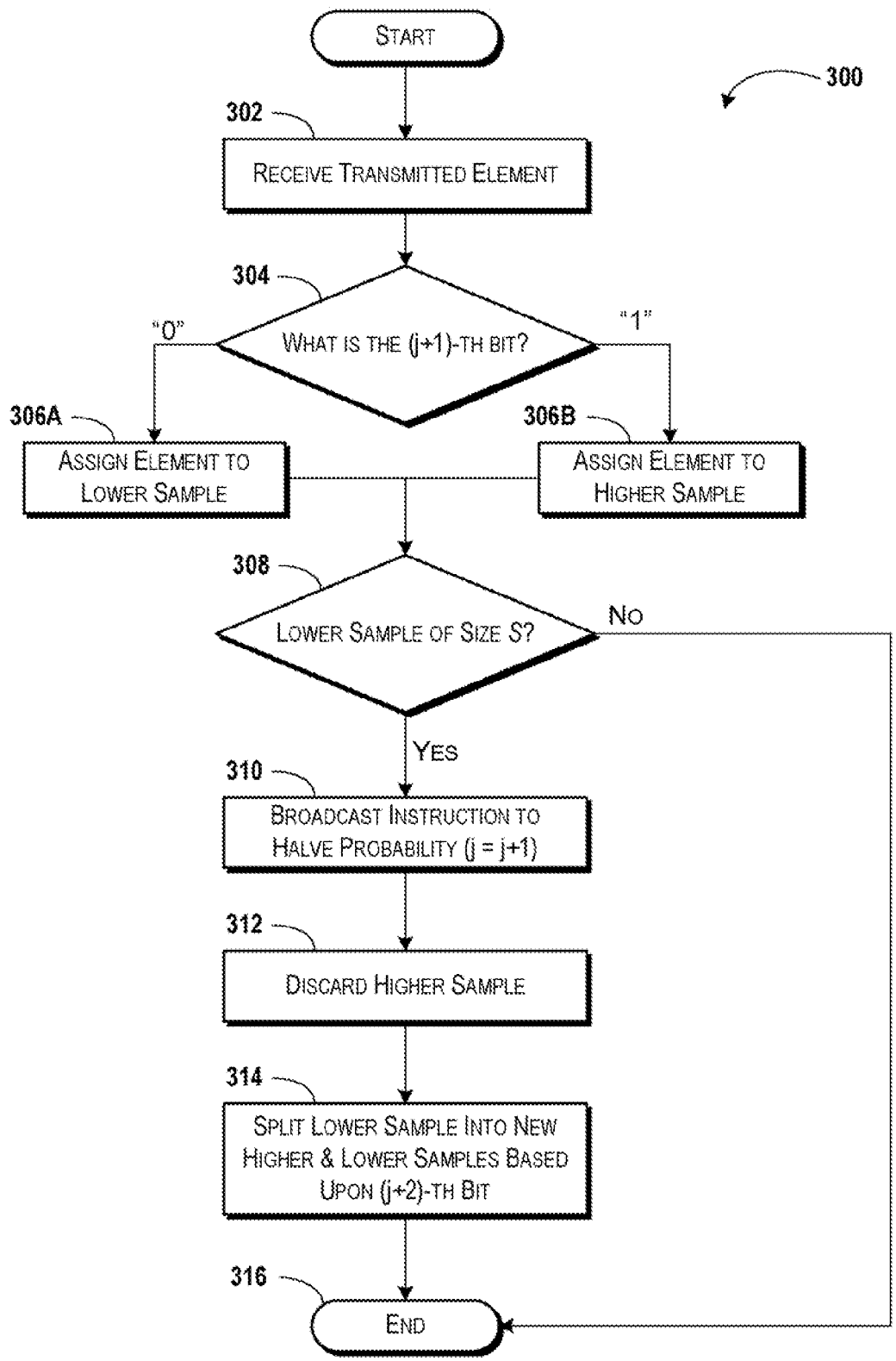
FIG. 3 is a flow diagram showing aspects of a method for drawing a sample from distributed streams of data, according to an exemplary embodiment.

Turning now to FIG. 3, a method 300 for drawing a sample 114 from the data elements 108 from distributed streams of data is illustrated, according to an exemplary embodiment. For purposes of illustrating and describing the concepts of the present disclosure, the method 300 is described as being performed by the coordinator device 110. The coordinator device 110 can provide the functionality described herein via execution of the sampling application 112, though this is not necessarily the case. It should be understood that the illustrated embodiment is exemplary, and should not be viewed as being limiting in any way.

The method 300 begins with operation 302, wherein the coordinator device 110 receives a data element 108, which can be transmitted by one of the site servers 102. The coordinator device 110 can be configured to draw a sample 114 from received data elements 108 by sampling received data elements 108 with a desired probability $2^j$, wherein j is any integer. For purposes of describing the concepts and technologies disclosed herein, it is assumed that the method 300 begins with j=3, i.e., a probability $p=2^3=⅛$. Similarly, it is assumed that only data elements 108 having all zeros in each bit of their respective binary strings, up to and including the $j^{th}$ bit of their respective binary strings, are selected for the sample 114. It should be understood that these embodiments are exemplary, and should not be construed as being limiting in any way.

From operation 302, the method 300 proceeds to operation 304, wherein the coordinator device 110 examines the $(j+1)^{th}$ bit of the binary string of the data element 108 to determine if the $(j+1)^{th}$ bit of the binary string is a "0" or a "1." In the illustrated example, wherein j=3, the fourth bit of the binary string is examined. If the $(j+1)^{th}$ bit of the binary string is "0," the method 300 proceeds to operation 306A, and the data element 108 is assigned to a pool of data elements 108 referred to herein as a "lower sample." It will be appreciated that the data elements 108 of the lower sample have a "0" in each of j=j+1 bits of the binary string. Thus, the data elements 108 of the lower sample will satisfy a sampling probability of j=j+1, and therefore can be used to draw the sample 114 after j is increased by one. If the $(j+1)^{th}$ bit of the binary string is "1," the method 300 proceeds to operation 306B, wherein the coordinator device 110 assigns the data element 108 to a pool of data elements 108 referred to herein as the higher sample.

From operations 306A and 306B, the method 300 proceeds to operation 308, wherein the coordinator device 110 determines if the lower sample has a size "s," wherein s is a desired sample size. If the coordinator device 110 determines that the lower sample does not have a size "s," the method 300 ends. It should be appreciated that the operations of the method 300 can be repeated the next time a transmitted data element 108 is received at the coordinator device 110. If the coordinator device 110 determines that the lower sample does have a size "s," the method 300 proceeds to operation 310.

In operation 310, the coordinator device 110 broadcasts an instruction to the site servers 102, the instruction informing the site servers 102 to halve the probability used to tag and transmit the data elements 108 to the coordinator device 110. In some embodiments, the coordinator device 110 broadcasts a value for j used by the site servers 102 to tag and transmit the data elements 108. Thus, in operation 310 the coordinator device 110 increments the value of j, i.e., the coordinator device 110 broadcasts a new value for j, wherein the new value for j is the previous value of j+1. It should be understood the coordinator device 110 can use other methods of instructing the site servers 102, and that this embodiment therefore should be understood as exemplary, and should not be construed as being limiting in any way.

From operation 310, the method 300 proceeds to operation 312, wherein the coordinator device 110 discards the higher sample of data elements 108. From operation 312, the method 300 proceeds to operation 314, wherein the coordinator device 110 splits the lower sample into a new higher sample and a new lower sample based upon analysis of the next bit in the binary string. In the illustrated embodiment, the coordinator device 110 analyzes the fifth bit in the binary string, i.e., the (old value of j+2)$^{th}$ bit of the binary string, which is now the (new value of j+1)$^{th}$ bit of the binary string. It should be understood that the method 300 can include functionality substantially equivalent to operations 304-306B in or after the operation 312, but these operations are not illustrated in FIG. 3 for the sake of brevity. The method 300 ends at operation 316.

Although not illustrated in FIG. 3, it should be understood that the operations of the method 300 can be provided again the next time a data element 108 is received at the coordinator device 110. Because the higher sample is not discarded until the lower sample has "s" data elements 108, it will be appreciated that a sample 114 of size s can be taken at any time from the data elements 108 in the lower sample and the higher sample. Additionally, it should be understood that depending upon how many iterations of the method 300 are provided, it may become necessary to provide additional bits in the binary string associated with each data element 108. According to various embodiments, the coordinator device 110 can add bits to the binary string at any time, and/or assign values to the newly created bits of the binary strings.

The operations described above with reference to FIGS. 2-3 are based upon an infinite window, with respect to time and sequence. Additionally, the operations described above assume sampling without replacement. As mentioned above, however, some embodiments of the concepts and technologies disclosed herein include variations of the sampling methods and/or algorithms described herein. For example, the coordinator device 110 is configured, in some embodiments, to sample data elements 108 according to a time-based window, a sequence-based window, and/or sampling with or without replacement. These embodiments are described in more detail below.

In some embodiments, the coordinator device 110 performs some or all operations of the method 300 by applying an algorithm to the received data elements 108. For purposes of illustrating the concepts and technologies disclosed herein, the notation e is used to denote a data element 108 received by the coordinator device 110. The notation b(e)[x] is used to denote a value of the binary string at the x$^{th}$ position. The e are transmitted by the site servers 102 applying a probability p, wherein p=$2^{-j}$, wherein j is any real integer. Furthermore, the following algorithm uses the notations $T_j$ and $T_{(j+1)}$ for the two subsamples of the data elements 108, i.e., the higher sample and the lower sample, respectively.

According to some embodiments, the coordinator device 110 applies the following algorithm in round j. For each received e, the coordinator device 110 determines if b(e)[j+1]=0. If so, the coordinator device 110 puts e in $T_{(j+1)}$. If not, the coordinator device 110 puts the e in $T_j$. The coordinator device 110 determines the size of $T_{(j+1)}$. If the size of $T_{(j+1)}$ (denoted by |$T_{(j+1)}$|)=a desired sample size s, then the coordinator device 110 provides additional steps. If |$T_{(j+1)}$|≠s, the algorithm ends, and the coordinator device 110 waits for the next e. The additional steps provided if |$T_{(j+1)}$|=s include the following: for each e in $T_{(j+1)}$, the coordinator device 110 examines b(e)[j+2]. If b(e)[j+2]=0, the coordinator device 110 puts e into a new lower sample $T_{(j+2)}$. Otherwise, the coordinator device 110 puts e into the new higher sample $T_{(j+1)}$. The coordinator device 110 discards $T_j$ and broadcasts an instruction to the site servers 102 to halve p, i.e., the coordinator device 110 increments the value of j by one; j=j+1; and the coordinator device 110 advances to the next round j.

In accordance with the above concepts, another method of sampling can be understood. In particular, in some embodiments, the site servers 102 and the coordinator device 110 apply sampling with replacement to data elements 108 received at the site servers 102 and the coordinator device 110. In sampling with replacement, the coordinator device 110 runs instances of a modified version of the algorithm set forth above in parallel s times. The j$^{th}$ round is terminated only when every instance of the algorithm has terminated the j$^{th}$ round. In other words, in round j≧0 for each data element 108 (e) that arrives at the site server 102, the site server 102 generates s binary strings $b_1(e), \ldots, b_s(e)$. If any of these s strings has a value of 0 in each of j bits of the string, the element e is forwarded to the coordinator device 110, with an index i indicating which of the s binary strings $b_1(e), \ldots, b_s(e)$ had a value of 0 in each of j bits of the string.

According to some embodiments, the site servers 102 execute an algorithm to provide the sampling with replacement as follows. For each e, the site servers 102 determine if i=1, ..., s. If i=1, ..., s, the site servers 102 assign f=1. For each l=1, ..., j, if b(e)[l]≠0 then f=0. If f=1, the site server 102 sends (e,i) to the coordinator device 110.

The coordinator device 110, meanwhile, receives the data element 108 (e) tagged with the index i. For each index i, the coordinator device 110 retains a single data element 108 as T[i], along with its current binary string b[i]. During round 0, the first time a data element 108 (e) arrives for a particular index i, the coordinator device 110 stores the data element 108 (e) as T[i]. For each data element 108 (e) received in round j for index i with binary strings b(e), the coordinator device 110 ensures that both strings b(e) and b[i] have enough bits generated so that b(e)≠b[i]. The two strings b(e) and b[i] are interpreted as integers. If b[i]<b(e), data element 108 (e) is discarded. If b(e)<b[i], e replaces T[i], and b[i] is overwritten with b(e). The $j^{th}$ round terminates when the $j^{th}$ bit of b[i], b[i][j] is 0 for all i. When the $j^{th}$ round is terminated, the coordinator device 110 begins the $(j+1)^{th}$ round by broadcasting an instruction to the site servers 102 to sample with probability $p=2^{-(j-1)}$. At any time, the coordinator device 110 can obtain a sample 114 of size s with replacement by reporting T[i] for all i=1, . . . , s.

According to some embodiments, the coordinator device 110 also executes an algorithm to provide the sampling with replacement as follows. For each (e, i) received, the coordinator device 110 determines if $b_i(e)$<b[i]. If so, the coordinator device 110 overwrites T[i] with e, and replaces b[i] with b(e). If $\forall 1 \leq i \leq s$: b[i][j]=0, then the coordinator device 110 sets j=j+1, broadcasts the new j to the site servers 102, and advances to the next round.

The above methods of sampling, i.e., sampling with replacement and sampling without replacement, are described as being provided over an infinite sequence of received data elements 108. As mentioned above with reference to FIG. 1, the site servers 102 and the coordinator device 110 can modify the sampling methods described above by limiting the pool of data elements 108 to a sequence-based sliding window and/or a time-based sliding window.

Figure 4:
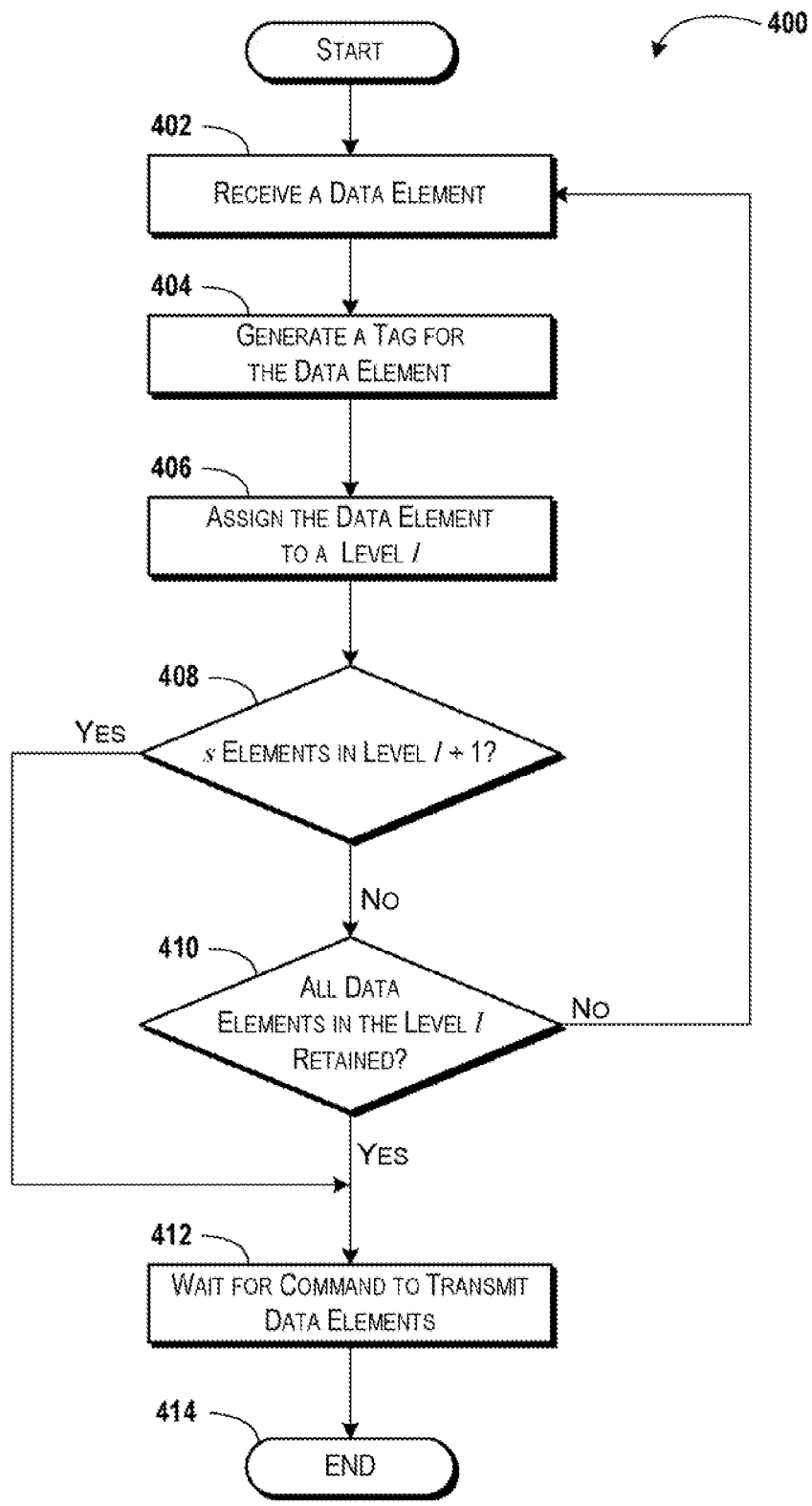
FIG. 4 is a flow diagram showing aspects of a method for transmitting data elements for use in sampling without replacement in a time-based window from distributed streams of data, according to an exemplary embodiment.

Turning now to FIG. 4, a method 400 for transmitting data elements 108 to a coordinator device 110 for use in sampling without replacement in a time-based window from distributed streams of data is illustrated, according to an exemplary embodiment. For purposes of illustrating and describing the concepts of the present disclosure, the method 400 is described as being performed by one of the site servers 102 (referred to in the description of FIG. 4 as "the site server 102"). The site server 102 can provide the functionality described herein via execution of the reporting application 106, though this is not necessarily the case. It should be understood that the illustrated embodiment is exemplary, and should not be viewed as being limiting in any way.

The method 400 begins with operation 402, wherein the site server 102 receives a data element 108. As explained above, the received data element 108 can include data collected by network devices or nodes, and can include network performance data, network traffic data, and/or other data associated with the network 104. Thus, the data element 108 can be transmitted to the site server 102 from almost any device operating on or in communication with the network 104. The method 400 proceeds to operation 404, wherein the site server 102 generates a tag for each incoming data element 108, as explained above with reference to operation 204 of FIG. 2. As explained above, the tag generated in operation 404 can include a time stamp and/or a binary string.

From operation 404, the method 400 proceeds to operation 406, wherein the site server 102 assigns the data element 108 to a level. The site server 102 assigns the data element 108 to a level based on the contents of the binary string associated with the data element 108. More particularly, the site server 102 examines the binary string and assigns the data element 108 to level l if the first l−1 bits of the binary string are "0." In other words, if the binary string has a prefix of i zeroes, the data element 108 is assigned to all levels $1 \leq i+1$. The data element 108 is stored in a queue for the assigned level l. The site server 102 maintains the queue of the most recent data elements 108 assigned to the level l until either of two conditions are met, as set forth below in operations 408 and 410, respectively.

At operation 408, the site server 102 determines if there are s elements in the level l+1, i.e., the level higher above the level l in which the data element 108 was placed in operation 406. If the site server 102 determines that there are not yet s data elements 108 in the level l+1, the method 400 proceeds to operation 410, wherein the site server 102 determines if all data elements 108 in level l are retained. If the site server 102 determines that all of the data elements 108 in the level l are not retained, the method 400 returns to operation 402, wherein the site server 102 receives another data element 108. It should be understood that the method 400 can end, instead of returning to operation 402, and can be iterated again when another data element 108 is received. If all of the data elements 108 at the level l are retained, or if the site server 102 determines that there are s elements in the level l+1 in operation 408, the method 400 proceeds to operation 412, wherein the site server 102 waits for a command to transmit one or more of the data elements 108 to the coordinator device 110. The method 400 ends at operation 414.

In some embodiments, the site server 102 provides the functionality described above by execution of an algorithm. The algorithm executed by the site server 102 includes the following steps. For each e, the site server 102 sets the level to level 0, i.e., l=0. The site server 102 then repeats the following steps: the level l is incremented by 1, i.e., l=l+1. The site server 102 inserts the data element 108 into a queue associated with the current level l. While the queue for the level l has greater than s data elements 108 from levels above the level l, the oldest data element 108 in the queue for the level l may be deleted. These steps are repeated until b(e)[l]=1.

Figure 5:
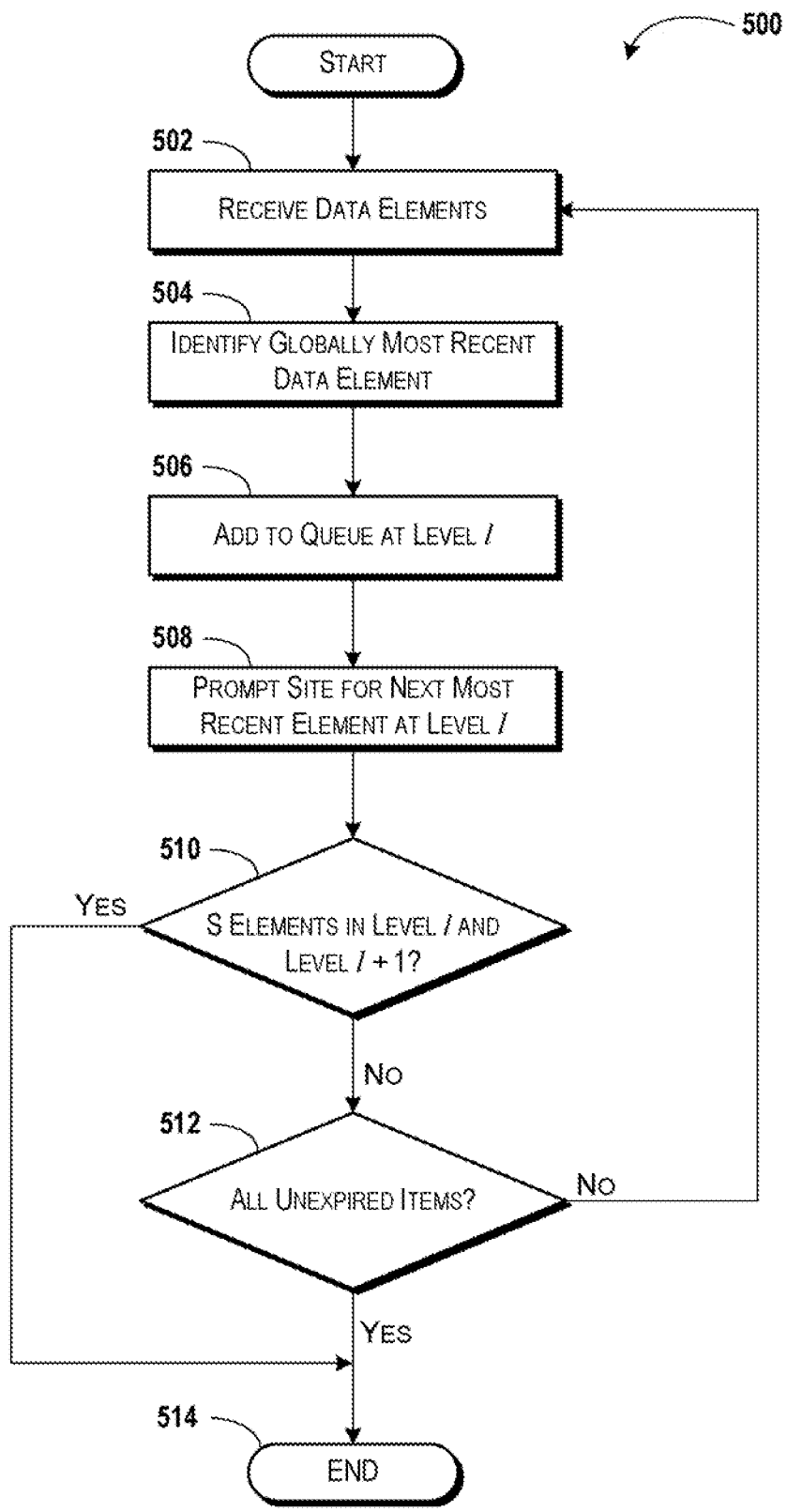
FIG. 5 is a flow diagram showing aspects of a method for sampling without replacement in a time-based window from distributed streams of data, according to an exemplary embodiment.

Turning now to FIG. 5, a method 500 for sampling without replacement in a time-based window from distributed streams of data is illustrated, according to an exemplary embodiment. For purposes of illustrating and describing the concepts of the present disclosure, the method 500 is described as being performed by the coordinator device 110. The coordinator device 110 can provide the functionality described herein via execution of the sampling application 112, though this is not necessarily the case. It should be understood that the illustrated embodiment is exemplary, and should not be construed as being limiting in any way.

In the method 500, the coordinator device 110 can track a current time window w. To track a current time window w, the coordinator device 110 initiates an instance of the infinite sampling without replacement protocol set forth above with reference to FIGS. 2-3. This instance of sampling is terminated after w time units, at which time a new instance of the infinite sampling without replacement protocol is initiated. Each period of time w, i.e., the time during which an instance of the infinite window sampling without replacement protocol is executed, is referred to herein as an "epoch." The start point of an epoch is denoted as T. It should be understood that the sampling described above with reference to FIG. 4 is begun anew at the commencement of each epoch. Furthermore, the site servers 102 maintain recent data elements 108 sampled in accordance with various sampling rates. The site servers 102 can be configured to keep these data elements 108 private until the end of an epoch, at which time the coordinator device 110 collects the data elements 108 from the site servers 102.

The method 500 begins with operation 502, wherein the coordinator device 110 receives data elements 108 from the site servers 102. The data elements 108 can be received from the site servers 102 at the end of an epoch. The site servers 102 can transmit the data elements 108 when the epoch ends, or in response to an instruction broadcast by the coordinator device 110.

In some embodiments, for example, the coordinator device 110 recognizes the end of an epoch. The coordinator device 110 instructs the site servers 102 to send the most recent sampled data element 108 at a level l corresponding to the highest level at which any data elements 108 have been sampled by the site servers 102. It will be appreciated that each of the site servers 102 can generate queues of data elements 108 in accordance with the operations of the method 400 described above with reference to FIG. 4.

From operation 502, the method 500 proceeds to operation 504, wherein the coordinator device 110 reviews the received data elements 108 and identifies the globally most recent data element 108 in the received data elements 108. As mentioned above, each data element 108 received at the site servers 102 can be tagged with a time stamp in addition to the binary string. Thus, the coordinator device 110 can determine the globally most recent data element 108 in the received data elements 108 by simply reviewing timestamps of the respective data elements 108, if desired.

From operation 504, the method 500 proceeds to operation 506, wherein the coordinator device 110 adds the globally most recent data element 108 to a queue associated with level l. From operation 506, the method 500 proceeds to operation 508, wherein the coordinator device 110 prompts the site server 102 associated with the globally most recent data element 108 to send the next most recent data element 108 at level l. The coordinator device repeats the operations 502-504 until one of two conditions are met, as set forth below with respect to operations 510 and 512.

In operation 510, the coordinator device 110 determines if the coordinator device 110 has received s data elements 108 relating to the level l that also were sampled in level l+1. If the coordinator device 110 determines that there are not s data elements 108 in level l that also were sampled in level l+1, the method 500 proceeds to operation 512, wherein the coordinator device 110 determines if the coordinator device 110 has received all unexpired data elements 108 of the level l from the site servers 102. If the coordinator device 110 determines that the coordinator device 110 has not yet received all unexpired data elements 108 of the level l from the site servers 102, the method 500 returns to operation 502. If the coordinator device 110 determines that the coordinator device 110 has received all unexpired data elements 108 of the level l from the site servers 102, or if the coordinator device 110 determines at operation 510 that there are s data elements 108 in level l and level l+1, the method 500 ends, as illustrated at operation 514.

At any time, the coordinator device 110 can produce a uniform random sample 114 of size s from a current time window of duration w. The coordinator device 110 considers the data elements 108 received in the most recent epoch, as defined above, and identifies a level l in the data structure that has at least s unexpired data elements 108. The coordinator device 110 also takes the current set of data elements 108 from the instance of the infinite sampling without replacement process executing in round j. Thus, the coordinator device 110 has a first set A of data elements 108 from the current epoch. These data elements 108 are sampled with probability of $2^{-j}$. The coordinator device 110 also has a second set B of data elements 108 from the time window sampled with probability of $2^{-l+1}$.

The coordinator device 110 analyzes the sets A, B. If j=l–1=0, then the coordinator device 110 recognizes that all data elements in the time window have been sampled. If not, then at least one of the sets A, B has at least s data elements 108. Letting x=max(j, l–1), the coordinator device 110 selects all data elements having a b(e) with at least x zeroes, thereby representing a Bernoulli sample 114 with probability of $2^{-x}$. Thus, the coordinator device 110 is able to take a sample 114 of at least s data elements 108 as a final sample.

From the above descriptions of sampling with and without replacement over an infinite time period, and sampling without replacement over a time-based window, additional embodiments of sampling from distributed streams can more easily be understood. In particular, various embodiments include sampling with replacement over a time-based window, sampling without replacement over a sequence-based window, and sampling with replacement over the sequence-based window.

With respect to sampling with replacement over the time-based window, the coordinator device 110 again makes use of the concept of epochs, as defined above. For a current epoch, the infinite sampling without replacement protocol is again used to maintain a sample 114 at the coordinator device 110 of unexpired data elements 108 in a time ranging from the start point T of the most current epoch to a current time t. For a previous epoch, each site server 102 maintains s independent copies of the level sampling data structure described above, wherein the $i^{th}$ copy is based on the $b_i(e)$ values. For each level l, the coordinator device 110 obtains the most recent sampled data element 108 from each site server 102 for any of the s instances of the data structure. The coordinator device 110 merges the samples until the coordinator device 110 has enough samples for each of the s instances of the data structure.

To form a sample at time t, the coordinator device 110 extracts all samples from the appropriate level l of the merged data structure as $B_i$ at level l. A binary string $b_i(e)$ is available for each data structure in $B_i$. It should be noted that $B_i$ may contain more than one sampled data element 108. The coordinator device 110 also extracts the sample from an executing instance of the infinite sampling without replacement at round j, along with that sample's associated binary string b[i]. The coordinator device 110 compares the binary strings $b_i(e)$ and b[i], and selects the data element 108 with the smallest $b_i(e)$ as the sample. If the binary strings $b_i(e)$ and b[i] are identical, the coordinator device 110 can examine additional bits of the binary strings $b_i(e)$ and b[i]. The coordinator device 110 also can assign additional bits of the binary strings $b_i(e)$ and b[i] until the tie is broken.

As mentioned above, various embodiments also support sampling over a sequence-based window. The sequence-based window described herein generally refers to a window W of data elements 108. The W data elements 108 correspond to the W most recently received data elements 108, from the point of view of the entire system 100, not merely the individual site servers 102. The coordinator device 110 uses a threshold monitoring protocol that can determine, for a given r, when exactly r new data elements 108 have arrived at the system 100.

In sequence-based window sampling without replacement, the threshold monitoring protocol is initiated by a message from the coordinator device 110 instructing all of the k site servers 102 to begin a first round, round 1. The coordinator device 110 terminates the threshold monitoring protocol when exactly r data elements 108 have been observed across the site servers 102. Each site server 102, maintains a local counter for counting data elements 108 that have been observed at that site server 102. In round j, each site server 102 counts each arriving data element 108. When the local counter reaches or exceeds $r2^{-j}/k$, the site server 102 informs the coordinator device 110 and reduces the local counter by $r2^{-j}/k$. The coordinator device 110, meanwhile, increases a global counter by $r2^{-j}/k$, reflecting the total number of data elements 108 received at the entire system 100.

After the coordinator device 110 receives k counter-increase messages, the coordinator device 110 starts the next round j+1, and announces the commencement of the new round to the site servers 102. The threshold monitoring protocol reaches the final round when the global counter reaches the range of $|r-O(k),r|$. In the final round, each site server 102 sends a message to the coordinator device 110 upon arrival of each data element 108, and the coordinator device 110 increments the global counter by 1 for each received message. The final round continues until the arrival of exactly r data elements 108 has been counted at the coordinator device 110. Thus, the threshold management protocol can identify the exact moment at which r data elements 108 have been received by the system 100.

In practice, the coordinator device 110 runs an instance of the threshold monitoring protocol to demark every multiple of W arrivals. When W arrivals are noted, the running instance of the threshold monitoring protocol terminates, and a new instance is commenced. During each window W, the coordinator device 110 executes an instance of the infinite sampling without replacement process described above to draw a sample 114 of size s. When the window W ends, the coordinator device 110 "freezes" the current sample S and begins sampling from the new window W.

According to various embodiments, the coordinator device 110 is able to review the data elements 108 in the now-frozen sample S to identify data elements 108 that have not expired, i.e., those data elements 108 that are not outside of a window of the W most-recently-received data elements 108 in terms of the data elements 108 received at the entire system. The coordinator device 110 is therefore able to draw a sample 114 of size s at any time t without replacement. The coordinator device extracts all data elements 108 from S that are not outside of the window of W most-recently-received data elements 108, and supplements those data elements 108 using the infinite sampling without replacement process executed on the current window W. It should be noted that at the moment a second window W is frozen, each data element 108 in a previously frozen window will have expired.

In sequence-based window sampling with replacement, s instances of the sequence-based window sampling without replacement protocol set forth above are executed in parallel. These instances, however, share one instance of the threshold monitoring protocol set forth above, the threshold monitoring protocol again being used for the same purpose, i.e., to freeze a current window W and commence a new window when the current window W is frozen. Each parallel instance of the sequence-based window sampling without replacement retains only one data element 108 from the frozen sample S, and a single data element 108 from the current window W, which is used to replace the data element 108 from the sample S when the data element 108 from S expires.

As mentioned above, the above-described methods of sampling with and without replacement, over infinite time, and/or in time-based or sequence-based windows, can be used to obtain samples from numerous streaming data sources. In some embodiments, the data sources include reporting or tracking nodes and devices of the communications network 104, an exemplary embodiment of which is presented below with reference to FIG. 6.

Figure 6:
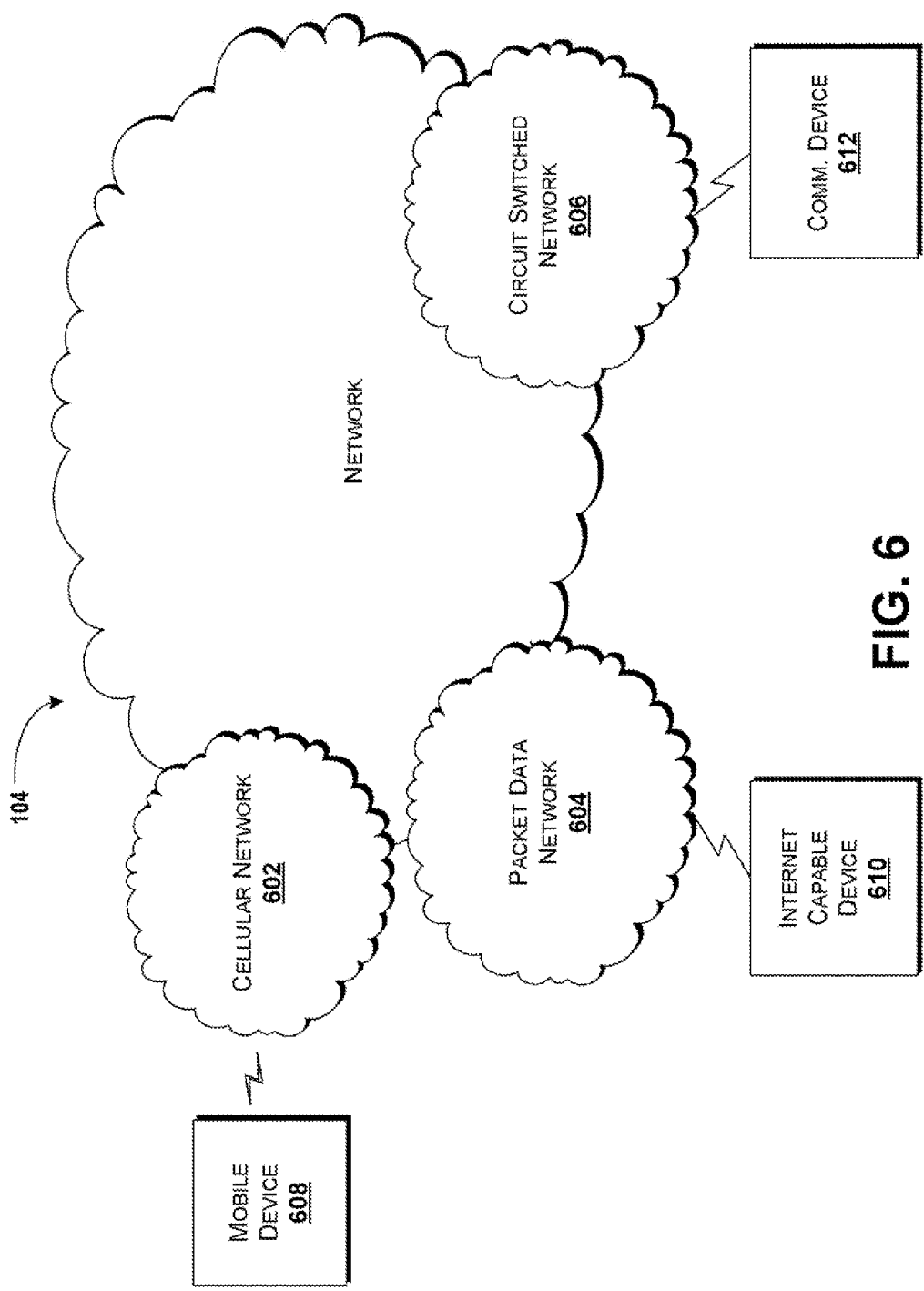
FIG. 6 schematically illustrates a network, according to an exemplary embodiment.

Turning now to FIG. 6, additional details of the network 104 are illustrated, according to an exemplary embodiment. The network 104 includes a cellular network 602, a packet data network 604, for example, the Internet (Internet), and a circuit switched network 606, for example, a publicly switched telephone network (PSTN). The cellular network 602 includes various components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, an Internet protocol multimedia subsystem (IMS), and the like. The cellular network 602 also includes radios and nodes for receiving and transmitting voice, data, and combinations thereof to and from radio transceivers, networks, the Internet 604, and the PSTN 606.

A mobile communications device ("mobile device") 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM (Global System for Mobile communications) network, and can provide data communications via GPRS (General Packet Radio Service) and EDGE (Enhanced Data rates for GSM Evolution). Additionally, the cellular network 602 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+(Evolved HSPA). The cellular network 602 also is compatible with 4G mobile communications standards.

The Internet 604 includes various devices, for example, servers, computers, databases, and other devices in communication with another, as is generally known. The Internet 604 devices are accessible via one or more network links. The servers often store various files that are provided to a requesting device such as, for example, a computer, a terminal, a smart phone, or the like. Typically, the requesting device includes software (a "browser") for executing a web page in a format readable by the browser or other software. Other files and/or data may be accessible via "links" in the retrieved files, as is generally known. The PSTN 606 includes various hardware and software for providing circuit switched communications. The PSTN 606 may include, or may be, what is often referred to as a plain old telephone system (POTS). The functionality of a PSTN 606 or other circuit-switched network are generally known and will not be described herein in detail.

The illustrated cellular network 602 is shown in communication with the Internet 604 and a PSTN 606, though it should be appreciated that this is not necessarily the case. One or more Internet-capable devices 610, for example, a PC, a laptop, a portable device, the mobile device 608, a smart phone, or any other suitable device, can communicate with one or more cellular networks 602, and mobile devices 608 connected thereto, through the Internet 604. It also should be appreciated that the Internet-capable device 610 can communicate with the Internet 604 through the PSTN 606, the cellular network 602, and/or via other networks (not illustrated). As illustrated, a communications device 612, for example, a telephone, facsimile machine, modem, computer, or the like, can be in communication with the PSTN 606, and therethrough to the Internet 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the Internet 604, and/or the PSTN 606, alone or in combination with other networks, network elements, and the like.

Figure 7:
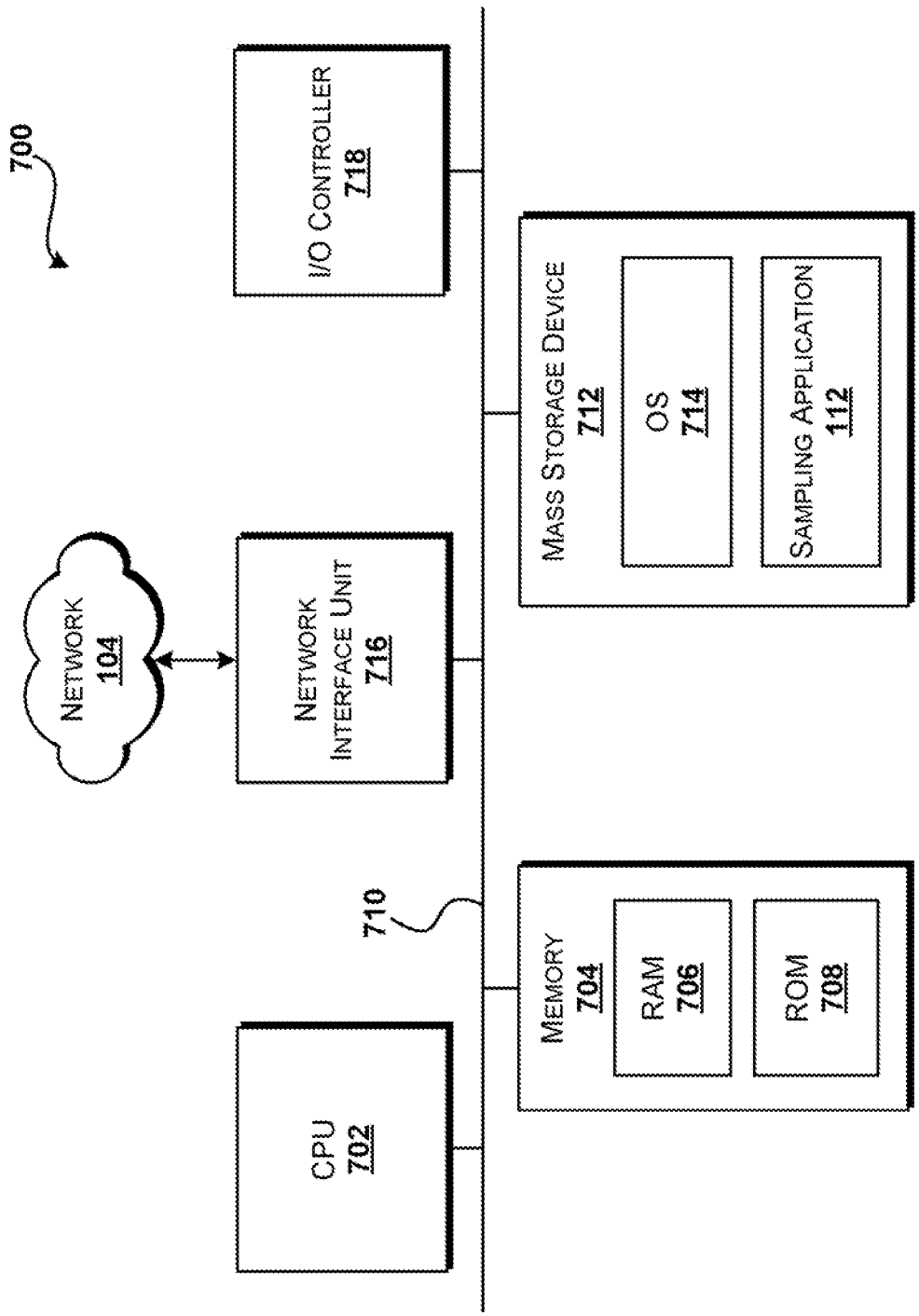
FIG. 7 is a computer architecture diagram illustrating an exemplary computer hardware and software architecture for a computing system capable of implementing aspects of the embodiments presented herein.

FIG. 7 illustrates an exemplary computer architecture 700 for a device capable of executing the software components described herein for sampling from distributed streams of data. Thus, the computer architecture 700 illustrated in FIG. 7 illustrates an architecture for the coordinator device 110 and/or the site servers 102, which can be embodied in one or more server computers, mobile phones, PDAs, smart phones, desktop computers, netbook computers, tablet computers, and/or laptop computers. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus ("bus") 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing the operating system 714 and the sampling application 112. The mass storage device 712 also can be configured to store the data elements 108.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a hard disk or CD-ROM drive, it should be appreciated by those skilled in the art that computer-readable media can be any available computer storage media that can be accessed by the computer architecture 700.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of this specification and the claims, the phrase "computer-readable storage medium" and variations thereof, does not include waves, signals, and/or other transitory and/or intangible communication media.

According to various embodiments, the computer architecture 700 may operate in a networked environment using logical connections to remote computers through a network such as the network 104. The computer architecture 700 may connect to the network 104 through a network interface unit 716 connected to the bus 710. It should be appreciated that the network interface unit 716 also may be utilized to connect to other types of networks and remote computer systems, for example, the site servers 102. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Based on the foregoing, it should be appreciated that technologies for sampling from distributed streams of data have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A computer-implemented method for sampling distributed streams of data, the method comprising computer-implemented operations for:
   receiving a data element at a coordinator device executing a sampling application, the data element comprising a binary string generated by a site server of a plurality of site servers in communication with the coordinator device, wherein the binary string comprises a first bit, a second bit, and a third bit, and wherein the binary string is transmitted by the site server in accordance with a probability established by the coordinator device;
   examining, by the coordinator device, the second bit of the binary string to determine whether to assign the data element to a lower sample or to assign the data element to a higher sample;
   determining, by the coordinator device, if the lower sample comprises a predetermined number of data elements; and
   taking an action, by the coordinator device, in response to determining that the lower sample comprises the predetermined number of data elements.

2. The method of claim 1, wherein taking the action comprises:
   broadcasting an instruction to halve the probability with which data elements are transmitted to the coordinator device;
   discarding the higher sample; and
   examining the third bit of the binary string to assign each data element in the lower sample into a new lower sample and a new higher sample.

3. The method of claim 2, wherein the data element comprises a measurement associated with a communications network, the measurement being observed at the site server.

4. The method of claim 1, wherein the data element further comprises a time stamp comprising data indicating a time at which the data element was received.

5. The method of claim 1, wherein the site server receives the data element, generates the binary string, and associates the binary string with the data element.

6. The method of claim 1, wherein the binary string further comprises a plurality of bits, each of the plurality of bits comprising a value of 0 or 1.

7. The method of claim 5, wherein the site server filters the data element according to a value of one or more bits of the binary string, and transmits the data element to the coordinator device if values of the one or more bits of the binary string are consistent with predetermined values corresponding to a filter condition.

8. The method of claim 1, further comprising:
   defining a time-based window during which the data element received is considered to be unexpired;
   determining if the data element was received within the time-based window; and
   including the data element in the sample, in response to determining that the data element was received within the time-based window.

9. A computer-readable storage medium having computer readable instructions stored thereupon that, when executed by a processor, cause the processor to perform operations comprising:
   receiving a data element at a coordinator device, the data element comprising a binary string generated by a site server of a plurality of site servers in communication with the coordinator device, wherein the binary string comprises a first bit, a second bit, and a third bit, and wherein the binary string is transmitted by the site server in accordance with a probability established by the coordinator device;
   examining, by the coordinator device, the second bit of the binary string to determine whether to assign the data element to a first sample or to a second sample;
   determining, by the coordinator device, if the first level sample comprises a predetermined number of data elements; and
   taking an action, by the coordinator device, in response to the determining that the first sample comprises the predetermined number of data elements.

10. The computer-readable storage medium of claim 9, wherein examining the binary string to determine whether to assign the data element to the first level or the second level comprises:
    determining if the data element comprises the globally most recently received data element for the first sample;
    adding the data element to a queue of data elements corresponding to the first sample, in response to the determining; and
    prompting a site server that transmitted the data element for a next most-recent data element at the first sample.

11. The computer-readable storage medium of claim 10, further comprising instructions that, when executed by the computer, cause the computer to:
    determine if the coordinator device has received all unexpired data elements from the site server, in response to determining that the first sample does not comprise the predetermined number of data elements.

12. A system comprising:
a processor; and
a memory that stores computer-executable instructions that, when executed by the processor, causes the processor to perform operations comprising
    receiving a data element comprising a binary string generated by a site server of a plurality of site servers, wherein the binary string comprises a first bit, a second bit, and a third bit, and wherein the binary string is transmitted by the site server in accordance with a probability established by a coordinator device;

examining, by the coordinator device, the second bit of the binary string to determine whether to assign the data element to a first sample or to assign the data element to a second sample;

determining, by the coordinator device, if the first sample comprises a predetermined number of data elements; and taking an action, by the coordinator device, in response to determining that the first sample comprises the predetermined number of data elements.

13. The system of claim 12, wherein the site server assigns a value to the first bit, the second bit, and the third bit.

14. The system of claim 12, wherein taking the action comprises:

broadcasting an instruction comprising a command to halve the probability with which data elements are transmitted from the plurality of site servers;

discarding the second sample; and examining the third bit of the binary string to assign each data element in the first sample to a third sample and a fourth sample.

15. The system of claim 12, wherein assigning the data element to the first sample or to the second sample comprises:

examining the second bit of the binary string;

assigning the data element to the first sample if a value of the second bit comprises 0; and assigning the data element to the second sample if the value of the second bit comprises 1.

16. The system of claim 12, wherein:

a probability with which a value of 0 is assigned to the first bit is exactly $\frac{1}{2}$;

a probability with which a value of 0 is assigned to the first bit and the second bit is exactly $\frac{1}{4}$;

a probability with which a value of 0 is assigned to the first bit, the second bit, and the third bit is exactly $\frac{1}{8}$; and a probability with which a value of 0 is assigned to the first bit, the second bit, the third bit, and a fourth bit is exactly $\frac{1}{16}$.

17. The system of claim 12, further comprising computer-executable instructions that, when executed by the processor, cause the processor to perform operations comprising:

defining a time-based window during which the data element received is considered to be unexpired;

determining if the data element was received within the time-based window; and including the data element in a level-sampling data structure, in response to determining that the data element was received within the time-based window.

18. The system of claim 17, wherein assigning the data element to the first sample or the second sample comprises:

determining if the data element comprises the globally most recently received data element for a bit level of the binary string; and in response to determining that the data element comprises the globally most recently received data element for the bit level of the binary string adding the data element to a queue of data elements corresponding to the first sample, prompting a site server that transmitted the data element for a next most-recent data element at the bit level.

19. The method of claim 6, wherein the value of the plurality of bits is independently set to 0 with a probability of one half.

20. The system of claim 13, wherein examining the binary string comprises examining the second bit of the binary string to determine whether the value of the second bit of the binary string comprises a 0 or a 1.

* * * * *